Figure 1:
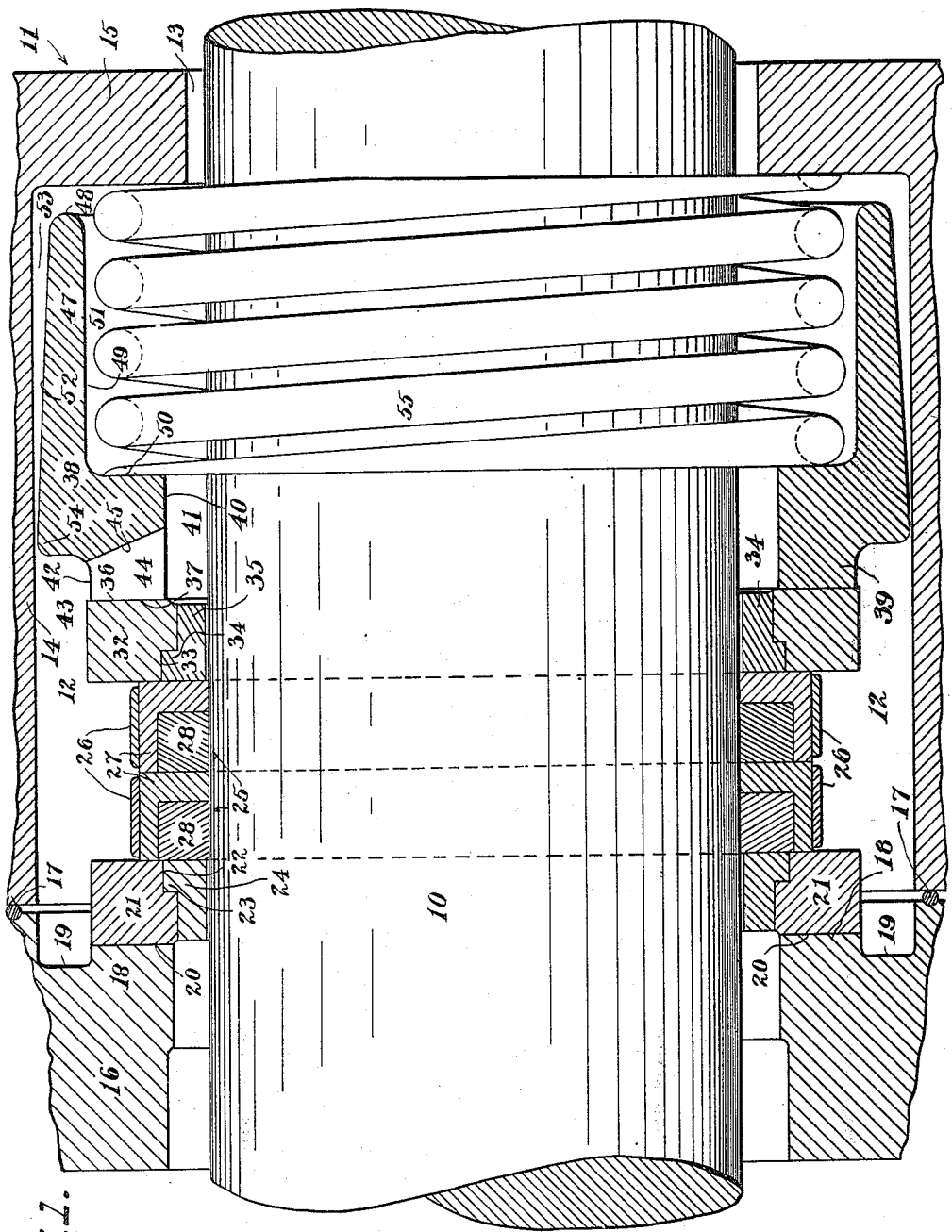

A. O. VAN DERVORT.
METALLIC PACKING.
APPLICATION FILED NOV. 24, 1914.

1,169,583.

Patented Jan. 25, 1916.
2 SHEETS—SHEET 1.

Witnesses:
Chas. G. Whitman.
Gustav Drews

Inventor:
Adrian O. Van Dervort,
By his Atty, F. H. Richards.

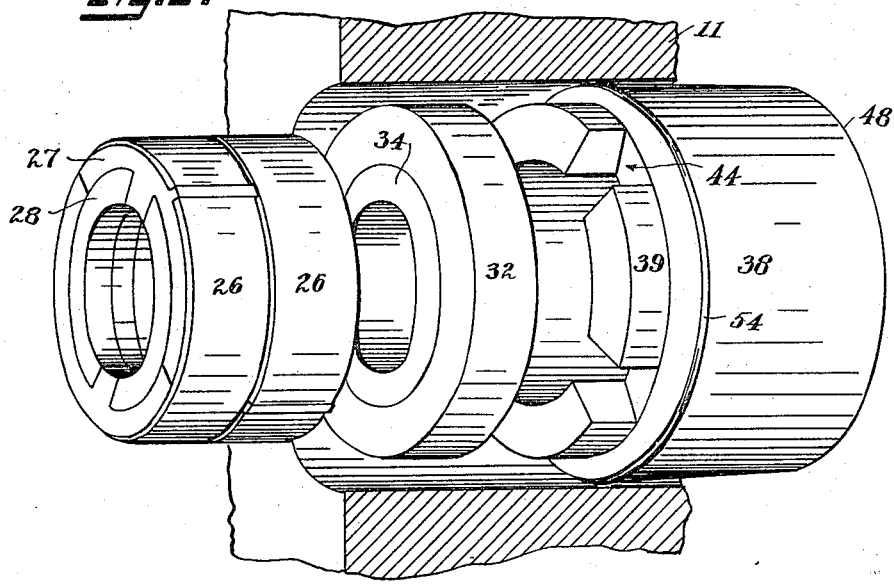
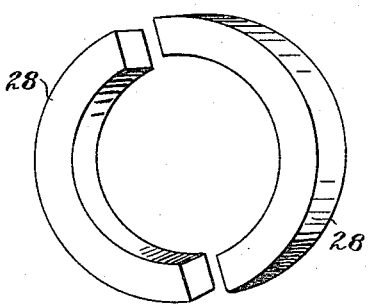
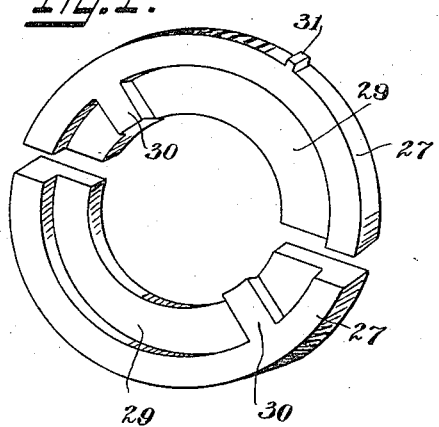

UNITED STATES PATENT OFFICE.

ADRIAN O. VAN DERVORT, OF TROY, NEW YORK.

METALLIC PACKING.

1,169,583. Specification of Letters Patent. Patented Jan. 25, 1916.

Application filed November 24, 1914. Serial No. 873,679.

*To all whom it may concern:*

Be it known that I, ADRIAN O. VAN DERVORT, a citizen of the United States, residing in Troy, in the county of Rensselaer and State of New York, have invented certain new and useful Improvements in Metallic Packing, of which the following is a specification.

This invention relates to packings and packing rings for the pistons of engines, particularly adapted for the pistons of steam engines.

Among the main objects of the invention, it is aimed to provide a packing arrangement whereby the pressure of the steam will be effectively utilized to tightly secure the packing rings in packing position; and also to provide an arrangement which will permit the vibratory movements of the piston without impairing its efficiency as a packing.

The principal object is to provide a packing especially adapted for use on steam engine cylinders particularly on locomotives where high pressures are employed and to so organize the several parts as to provide a minimum number of contacting surfaces which are subject to sliding movements while providing for a proper closing of the parts longitudinally of the piston rod by steam pressure; for providing a proper guidance of the closing spring by which initial closing operations longitudinally of the piston are obtained; and also for providing a free flowage of steam in a considerable volume between the interior of the cylinder and the annular space directly surrounding the packing rings.

Another object of the invention is to provide an arrangement whereby the packing rings and adjacent members may readjust themselves to tightly grip the piston rod as they are worn down due to the incessant sliding movement of the piston rod in rapid operation.

Still another object of the invention is to provide a packing arrangement which permits the free passage of steam into and out of the annular space surrounding the packing rings so that burnt oil and other debris contained in such steam will be less liable to settle into crevices and the like as is the case when the passage of steam is retarded in any way. And a still further object of the invention is to provide passages to the chamber surrounding the packing rings in the end of the follower which is adjacent to one of the packing ring retainers, whereby scrapers are formed which will scrape the end of such retainer to maintain the same free of burnt oil deposits and the like. This scraping action is made possible due to the fact that the rings in the stuffing box will rotate relative to one another in a slow creeping movement caused to a large extent by the reciprocation of the piston rod. And another object of the invention is to provide a follower for a packing arrangement which follower forms a guide for the closing spring, and also forms a rear limiting stop for the packing in case of emergency, and which follower has an annular fulcrum bearing in contact with the cylindrical wall of the stuffing box, while the remaining outer surface of the aforesaid extension which continues from such fulcrum bearing, is spaced apart from the cylindrical wall of the stuffing box thus reducing the frictional contact surfaces a substantial amount. And still another object of the invention is to provide a follower for a packing arrangement which follower forms a limiting stop for the packing when the piston is returning, and which follower is tapering in its outer annular surface, the larger end of which follower coincides with the annular periphery of the stuffing box to contact therewith, while the remaining outer annular surface of the follower is normally spaced from the annular periphery of the stuffing box.

Another object of the invention is to so construct the follower that it will not easily become inoperative as the deposits of burnt oil and other debris and the like adhere to the walls of the stuffing box, should these deposits become of sufficient magnitude to eventually cement the follower in place against movement. By means of the aforementioned tapering conformation of the follower, it can be readily removed by removing the deposits from the wall of the stuffing box in front of said follower.

These and other features, capabilities and advantages of the invention will appear from the subjoined detailed description of one specific embodiment thereof illustrated in the accompanying drawings in which—

Figure 1 is a full size fragmentary view showing the piston rod and spiral spring in full with the other parts in axial cross section. Fig. 2 is an isometric perspective view showing several of the parts disassembled. Fig. 3 is a perspective view of the two inner segments of the packing ring. Fig. 4 is a perspective view of the two housing segments of the packing ring.

In the embodiment shown, a piston rod 10 broken off, is illustrated freely movable in a housing 11 which may be integral with the end of the cylinder and comprises what is frequently called a stuffing-box, this housing forming a cylindrical chamber 12 of greater diameter than the passage 13 through which the piston rod passes into the cylinder and having a cylindrical wall 14 and a rear annular wall 15 around the passage 13. The chamber 12 has at one end and permitting free movement of the piston therethrough a cap piece 16 which is suitably secured to the said end of the housing 11 and suitably packed therewith by a ring 17.

The cap piece 16 has an inwardly extending annular wall member 18 which is slightly offset from the rear end of the cap piece 16 and is spaced therefrom by an annular groove 19. The face of the annular wall member 18 is finished to form a close fit with the outwardly extending finished face 20 of the front end ring 21. The inner peripheral face of the ring 21 is preferably provided with an annular recess 22 at its rear end to receive the annular outstanding portion 23 of the segmental ring 24 preferably made of bronze or the like and having a working fit with the piston rod 10. Adjoining the ring 21 there are provided, in the present instance, two segmental packing rings 25, similar to those illustrated in my Patent No. 821,682, which rings are each preferably surrounded by a spring band 26 to hold the several portions of each segmental ring from accidental disassemblage. Each of these rings as illustrated comprises two housing segments 27 and two inner segments 28, the housing segments being provided with chambers 29, spaced from one another by projections 30, which chambers are formed when the two segments 27 are placed together in packing position, each chamber overlapping one of the divisions between the two segments. By this arrangement, it is made impossible for the inner segments 28 to permit their divisions to register with the divisions of the housing segments 27 and thus prevent escape of steam therethrough. To prevent the displacement of the spring band 26, there is provided on one of the housing segments a projection or abutment 31.

At one end of the packing ring 25, there is provided a ring 32 similar to the ring 21 and having on its inner circular face an annular recess 33 to receive the annular outstanding portion 34 of the inner ring 35, which forms a working fit with the piston rod.

The face 36 of the end ring 32 also is finished to form a close fit with the finished face 37 of the follower 38. The follower 38 has a portion 39 having an inner cylindrical wall 40 of greater diameter than the diameter of the piston rod and forming with said piston rod an annular chamber 41. One end of the portion 39 is provided with an outer annular recess 42 to form an annular chamber 43 between the wall 14 of the housing 11 and the portion 39.

To permit the passage of steam from the chamber 41 to the chamber 43, there are provided a number of recesses 44 in the end of the portion 39, in the present instance five such openings being provided, which recesses have a rear inclining wall 45 inclining downwardly and backwardly. Due to the reciprocation of the piston rod 10, the several ring members and follower will have a rotary creeping action with respect to one another. Due to this creeping action, the face 36 of the end ring 32 will slide over the front face 37 of the follower 38, and by means of the side walls of the recesses 44 the face 36 of the end ring 32 will be scraped and thus any soot, burnt oil or the like that may have collected on such face will be scraped off. For this reason, recesses are preferably provided in the portion 39 of the follower 38 to afford communication between the chambers 41 and 43 instead of tubular openings.

The follower 38 is, in the present instance, provided with a narrow elongated extension 47, having a rounded end 48. The outer periphery of the extension 47 forms with the outer periphery of the enlarged part of portion 39, a continuous outer periphery 52 which is tapered narrowing in its rearward direction to its minimum at the rounded end 48. The inner periphery 49 of this extension 47 is of much greater diameter than the inner peripheral wall 40 of the portion 39, such inner peripheral wall 49 forming the cylindrical wall of a spring chamber 51 having for its front annular wall the rear annular face 50 of the portion 39 and for its rear annular wall the annular wall 15 of the housing 11.

The outer tapering wall 52 of the extension 47 and portion 39 normally forms a chamber 53 between the wall 14 and the peripheral wall 52, with a bearing surface at the rounded large end of the portion 39 having a working fit with the wall 14 of the housing 11. In the chamber 53 and abutting at one end against the wall 50 of the portion 39 of the follower 38 is disposed a spiral spring 55 surrounding the piston rod 10 and abutting at one end against the wall 15 of the housing 11, which spring normally presses the follower and several rings closely against one another, the follower thus serving as a guide for the spring 55.

With the outward stroke of the piston rod steam will pass through the passage 13 into the chamber 51, where it will exercise a pressure on the follower 38, the end ring 32, segmental ring 35, and together with the spring 55 press the same forward to pack them, with the packing rings 25 and end ring 21, closely together in an axial direction against the wall 18 and the cap piece 16. Thereupon and after the ring members have been crowded together in an axial direction, (which, however, it will be understood, is practically simultaneous with the aforementioned action), the steam freely passes through the recesses 44 into the chamber 43 where it is free to exercise pressure on the band springs 26 and packing rings 25 to snugly clamp such packing rings around the piston rod 10.

Due to the recess 42 of the portion 39, the distance the steam has to travel through the recesses 44 is much shorter than if the steam had to pass through the greatest thickness of the portion 39 while the diminution of the follower 38, not in any way weakens the follower for any of its other functions. Furthermore, by this arrangement, the communication from the chamber 41 to the chamber 43 may conveniently be made through recesses 44 which are adjacent to the face 36 of the end ring 32 whereby the side walls of the recesses 44 are permitted to act as scrapers, and whereby the steam can come into direct contact with the face 36 of the end ring 32 to furthermore clean off foreign matter that may there collect or be scraped up by the walls of the recesses 44. It is also to be noted, that by means of this free passage of steam rushing into and out of contact with the packing rings through the chamber 12, this steam will loosen and carry with it any foreign material, such as burned oil and the like, and prevents it from settling onto working surfaces and into crevices.

It will be seen that in the present arrangement, the end rings 21 and 32, the packing rings 25 and follower 38 are none of them fixed relative to one another. The wearing factor with a packing is one of the main factors that a successful and practical packing must take care of. By the present arrangement, when any of the members become worn, due to their freedom relative to one another, the others will be permitted to crowd up against the worn member, and all of the several members will readjust their positions to substantially compensate for such wear. If after such readjustment the several members incline toward one another and are disposed askew to the piston rod 55, by means of its tapered outer wall 52, the follower 38 would without impairing its clamping action tilt with the other members and continue its otherwise close fit with its adjacent end ring 32.

It will furthermore be seen that the end rings 24 and 35 have only a working fit with the piston rod 10 as compared to the tight fit of the packing rings 25. By this arrangement, the end rings will not in any way interfere with the aforesaid tilting action.

When the piston rod 10 returns in its operation, due to friction, the several members will normally tend to move backward, but the spring 55 is for ordinary purposes sufficient to counteract such tendency; but should sufficient adhesion occur between the piston rod and packing rings, the follower 38 may be forced back so far that its rear end 48 will strike the wall 15 of the housing 11 and there break the adhesion between the piston rod and packing rings. It will be seen that in this backward movement, by the present arrangement, the packing rings and end rings will tend to be carried rearward with the piston rod 10 and have no resisting surfaces to contend with, and that the follower 38 is the only member that has a resisting surface to contend with, namely, the contact of its normal limited bearing zone 54 with the wall 14 of the housing 11. By means of this bearing zone 54 on the follower 38, this invention has provided an arrangement wherein the contacting surface of the follower with the wall 14 is made harmless and practically immaterial in its effect on the operation of the packing arrangement. With arrangements wherein the entire surface of the extension 47 is in contact with the wall 14, burned oil and other foreign matter creeps in between the wall 14 and extension 47 and packs up so firmly that the follower 38 will quite frequently become immovable and its clamping efficiency be thereby impaired. With the present arrangement, this latter defect is not only less liable to happen, but furthermore due to the tapering surface 52 of the follower 38 when such adhesion does occur, it is only necessary to remove deposit from wall 14 in front of follower 38 as the follower can then be easily removed.

It is obvious that various changes and modifications in the details of construction may be made without in any way departing from the general spirit of the invention.

I claim:

1. In a packing for a piston rod, packing rings on said piston rod, an end ring on each side of said packing rings and mounted on said piston rod, a follower mounted on said piston rod, said follower having an annular recess on its forward outer end and having an inner peripheral wall of greater diameter than the diameter of said piston rod, there being a plurality of recesses in the forward end of said follower adjacent to one of said end rings and extending from the inner peripheral wall of said follower to the outer annular recess, the side walls of said plurality of recesses forming scraping edges to scrape the face of said adjacent end ring as said end ring and follower creep relative to one another in the operation of the piston rod.

2. In a packing, in combination with a housing forming an annular cylindrical chamber having a cylindrical wall, a rear annular wall, and a front annular wall, through which housing a piston rod is freely movable, packing rings in said chamber and mounted on said piston rod, a follower disposed between said rear annular wall and said packing rings, the inner periphery of said follower being of greater diameter than the periphery of the piston rod, means disposed between said follower and said rear annular wall normally pressing said follower forwardly to press said packing rings tightly together, there being an annular recess on the front outer end of said follower, the resulting diminished portion of said follower being divided into a plurality of segments spaced from one another, said segments being disposed adjacent to said packing rings so that the space between said segments will form passages between said follower and said packing rings for the free passage of steam therethrough into contact with said packing rings to press them against said piston rod.

3. In a packing, in combination with a housing forming an annular cylindrical chamber having a cylindrical wall, a rear annular wall, and a front annular wall, through which housing a piston rod is freely movable, a passage being formed between the rear annular wall of said housing and said piston rod to afford communication from the cylinder of an engine into said housing, packing rings in said chamber and mounted on said piston rod, a follower disposed between said rear annular wall and said packing rings, the inner peripheral wall of said follower being of greater diameter than said piston rod and forming a chamber therebetween, means disposed between said follower and said rear annular wall normally pressing said follower forwardly to press said packing rings tightly together, there being an annular recess on the rear outer end of said follower, the resulting diminished portion of said follower being divided into a plurality of segments spaced from one another, said segments being disposed adjacent to said packing rings so that the spaces between said segments will form passages between said follower and said packing rings thereby enabling the free passage of steam from the passage in said rear annular wall, through said latter spaces into contact with the packing rings to press them onto said piston rod.

4. In a packing, in combination with a housing forming an annular cylindrical chamber having a cylindrical wall, a rear annular wall, and a front annular wall, through which housing a piston rod is freely movable, a passage being formed between the rear annular wall of said housing and said piston rod to permit the passage of steam from the cylinder of an engine into said housing; packing rings in said chamber and mounted on said piston rod, an annular chamber being formed between said cylindrical wall and said packing rings, a follower disposed between said rear annular wall and said packing rings, the end of said follower nearest said packing rings having an annular recess on its outer edge forming a diminished portion, a number of steam passages through said diminished portion to permit the free passage of steam into the annular chamber surrounding said packing rings where said steam exercises a pressure in a radial direction on said packing rings to clamp them onto said piston rod, a limited bearing zone on said follower in contact with said cylindrical wall, the outer portion of said follower tapering from said bearing zone and narrowing as it approaches the rear end of said follower, on which bearing zone the follower is adapted to tilt with respect to said cylindrical wall in the operation of said piston rod.

5. In a packing, in combination with a housing forming an annular cylindrical chamber having a cylindrical wall, a rear annular wall, and a front annular wall, through which housing a piston rod is freely movable, a passage being formed between the rear annular wall of said housing and said piston rod to permit the passage of steam from the cylinder of an engine into said housing; packing rings in said chamber and mounted on said piston rod, an annular chamber being formed between said cylindrical wall and said packing rings, a follower disposed between said rear annular wall and said packing rings, a limited bearing zone on said follower in contact with said cylindrical wall, the outer portion of said follower tapering from said bearing zone and narrowing as it approaches its rear end, on which bearing zone the follower is adapted to tilt with respect to said cylindrical wall in the operation of said piston rod.

6. In a packing, in combination with a housing forming an annular cylindrical chamber having a cylindrical wall, a rear annular wall, and a front annular wall, through which housing a piston rod is freely movable, a passage being formed between the rear annular wall of said housing and said piston rod to permit the passage of steam from the cylinder of an engine into said housing; an outer end member adjacent to said front annular wall, packing rings mounted on said piston rod and adjacent to and rearwardly of said outer end member, an inner end ring adjacent to and rearwardly of said packing rings and mounted on said piston rod, a follower adjacent to and rearwardly of said inner end ring and mounted on said piston rod, said follower having a diminished front portion the outer periphery of which is of substantially less diameter than the diameter of said cylindrical wall, and the inner periphery of which follower is of greater diameter than the periphery of said piston rod, forming an annular chamber in communication with the passage in said rear annular wall, a limited bearing zone on said follower adjacent to said diminished portion and in contact with said cylindrical wall thus forming a substantially closed annular chamber around the outer periphery of said packing rings, the diminished portion of said follower being divided into a plurality of segments spaced from one another, said segments being disposed adjacent to said packing rings so that the spaces between said segments will form passages between said follower and said packing rings thereby enabling the free passage of steam from the passage under said rear annular wall through said latter spaces into contact with the packing rings to press them onto said piston rod.

7. In a packing, in combination with a housing forming an annular cylindrical chamber having a cylindrical wall, a rear annular wall, and a front annular wall, through which housing a piston rod is freely movable, a passage being formed between the rear annular wall of said housing and said piston rod to permit the passage of steam from the cylinder of an engine into said housing; an outer end member adjacent to said front annular wall, packing rings mounted on said piston rod and adjacent to and rearwardly of said outer end member, an inner end ring adjacent to and rearwardly of said packing rings and mounted on said piston rod, a follower adjacent to and rearwardly of said inner end ring and mounted on said piston rod, said follower having a diminished front portion the outer periphery of which is of substantially less diameter than the diameter of said cylindrical wall, and the inner periphery of which follower is of greater diameter than the periphery of said piston rod, forming an annular chamber in communication with the passage in said rear annular wall, a limited bearing zone on said follower adjacent to said diminished portion and in contact with said cylindrical wall thus forming a substantially closed annular chamber around the outer periphery of said packing rings, and a spring between the rear wall of said follower and the rear wall of said housing to normally press said follower, end rings and packing rings together in an axial direction, and an extension on said follower enveloping said spring and forming a guide therefor, the outer periphery of said follower including said extension being tapered and narrowing in its rearward extent so that in case of adhesion with said cylinder wall, the removal thereof will be facilitated.

8. In a packing, in combination with a housing forming an annular cylindrical chamber having a cylindrical wall, a rear annular wall, and a front annular wall, through which housing a piston rod is freely movable, a passage being formed between the rear annular wall of said housing and said piston rod to permit the passage of steam from the cylinder of an engine into said housing; an outer end ring adjacent to said front annular wall and mounted on said piston rod, packing rings adjacent to and rearwardly of said outer end ring mounted on said piston rod, an inner end ring adjacent to and rearwardly of said packing rings and mounted on said piston rod, a follower adjacent to and rearwardly of said inner end ring and mounted on said piston rod, said follower having a diminished front portion the outer periphery of which is of substantially less diameter than the diameter of said cylindrical wall, and the inner periphery of which follower is of greater diameter than the periphery of said piston rod, forming an annular chamber in communication with the passage in said rear annular wall, there being a plurality of recesses through the front end of the diminished portion affording communication between the annular chamber surrounding said packing rings and the annular chamber between said follower and piston rod to permit the passage of steam from under said rear annular wall into contact with the packing rings, the side walls of said plurality of recesses forming scraping edges to scrape the face of said adjacent end ring as said end ring and follower creep relative to one another in the operation of the piston rod.

9. In a packing for a piston rod, packing rings on said piston rod, an end ring on one side of said packing rings and mounted on said piston rod, a follower on said piston rod, said follower having an annular recess on its forward outer end and having an inner peripheral wall of greater diameter than the diameter of said piston rod, there being a plurality of recesses on the forward end of said follower adjacent to said end ring and extending from the inner peripheral wall of said follower to the outer annular recess, the side walls of said plurality of recesses forming scraping edges to scrape the face of said end ring as said end ring and follower creep relative to one another in the operation of the piston rod.

10. In a packing, in combination with a housing forming an annular cylindrical chamber having a cylindrical wall, a rear annular wall, and a front annular wall, through which housing a piston rod is freely movable, a passage being formed between the rear annular wall of said housing and said piston rod to permit the passage of steam from the cylinder of an engine into said housing; an outer end member adjacent to said front annular wall, packing rings mounted on said piston rod and adjacent to and rearwardly of said outer end member, an inner end ring adjacent to and rearwardly of said packing rings and mounted on said piston rod, a follower adjacent to and rearwardly of said inner end ring and mounted on said piston rod, said follower having a diminished front portion the outer periphery of which is of substantially less diameter than the diameter of said cylindrical wall, and the inner periphery of which follower is of greater diameter than the periphery of said piston rod, forming an annular chamber in communication with the passage in said rear annular wall, a limited bearing zone on said follower adjacent to said diminished portion and in contact with said cylindrical wall thus forming a substantially closed annular chamber around the outer periphery of said packing rings, the outer periphery of said follower being tapered so that in case of adhesion with said cylinder wall the removal thereof will be facilitated.

ADRIAN O. VAN DERVORT.

Witnesses:
  JOHN H. BARRINGER,
  GEO. A. HOLLINGER.

Copies of this patent may be obtained for five cents each, by addressing the "Commissioner of Patents, Washington, D. C."